July 21, 1959 R. L. JENKINS 2,896,146
OSCILLATOR STARTING CIRCUIT
Original Filed Jan. 18, 1956
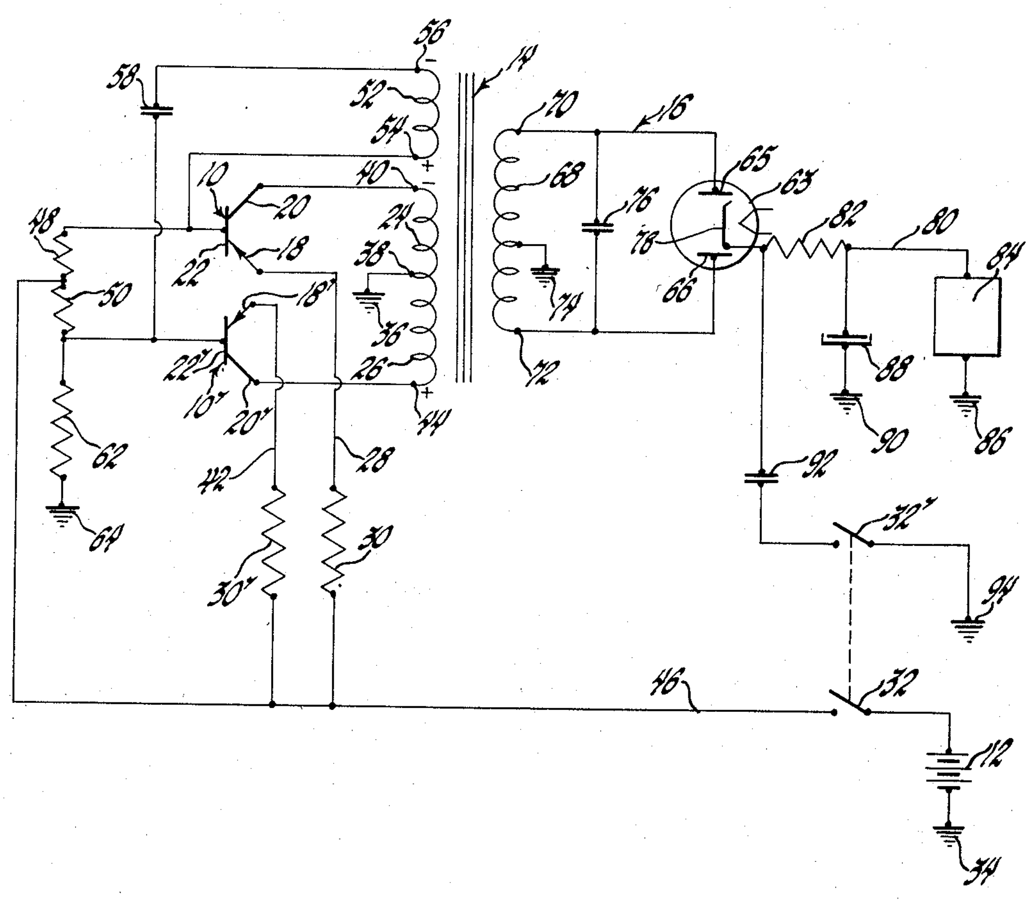
INVENTOR.
Richard L. Jenkins
BY
E. W. Christen
ATTORNEY United States Patent Office 2,896,146

Patented July 21, 1959

2,896,146

OSCILLATOR STARTING CIRCUIT

Richard L. Jenkins, Kokomo, Ind., assignor to General Motors Corporation, Detroit, Mich., a corporation of Delaware Continuation of application Serial No. 559,951, January 18, 1956. This application April 14, 1958, Serial No. 728,181

4 Claims. (Cl. 321—2)

This invention relates to oscillator circuits and more particularly to an improved starting circuit for an oscillator and rectifier arrangement. This application is a continuation of Serial No. 559,951, filed January 18, 1956, for "Oscillator Starting Circuit," now abandoned.

Transistor oscillators of various circuit configurations and especially those of the blocking type have been found admirably well suited for use in power supply circuits such as the high voltage plate supply circuit for electron tubes. In such power supply circuits the transistor oscillator may be energized from a low direct voltage source and is transformer coupled, with suitable voltage transformation, to a rectifier circuit for developing a high direct voltage for application to the load device. Transistor oscillator and rectifier circuits of this type are disclosed in the co-pending U.S. patent applications: S.N. 512,176 for "Transistor Power Oscillator," filed May 31, 1955, by Guyton and Vogt; S.N. 558,763 for "Push-Pull Transistor Oscillator," filed January 12, 1956, by Guyton and Jenkins; and S.N. 559,555 for "Push-Pull Transistor Oscillator," filed January 17, 1956, by Vogt and Scott, all of which are assigned to the assignee of the present invention.

In circuits of the aforementioned type it is desirable for various reasons to employ a thermionic or hot cathode high vacuum rectifier tube in the rectifier circuit. Although other types of rectifier devices, such as the gaseous rectifier tube, may be used with these circuits, factors of commercial availability and economy render the thermionic high vacuum rectifier tube highly desirable. However, in circuits heretofore devised which employ a thermionic rectifier difficulty has been encountered in obtaining reliable starting of the oscillator under certain conditions of operation.

This difficulty is occasioned by the fact that the thermionic rectifier tube is conductive at very low voltages, providing the cathode is heated sufficiently to be emissive. For example, if the oscillator and rectifier are operated for a period of time and deenergized, and then energized again, the oscillator may fail to build up. This occurs because the rectifier cathode remains heated to an emissive temperature and is conductive at low voltage. It therefore presents a low impedance circuit to the transistor oscillator through the coupling transformer. Consequently, the oscillator is heavily loaded and requires an excessive feedback power to permit oscillations to build up. It will now be apparent that the same difficulty will be encountered in starting an oscillator supplying a rectifier device of any type which is highly conductive at low voltage.

Accordingly, it is an object of this invention to provide circuit means to ensure reliable starting of an oscillator circuit for energizing a rectifier of the type which is highly conductive at low voltage.

An additional object of this invention is to provide a starting circuit for an oscillator adapted to energize a thermionic vacuum rectifier.

A further object is to provide an improved transistor oscillator starting circuit requiring a minimum of components.

A further object is to provide an improved rectifier circuit with means for delaying conduction through the rectifier.

In the accomplishment of these objects there is provided an oscillator energized rectifier circuit having circuit means for applying a bias voltage in the reverse or non-conducting direction to the electrodes of the rectifier device upon energization of the oscillator. Such circuit means may include a condenser which is charged by the rectifier itself to maintain the cathode positive with respect to the anode during the oscillator starting interval.

A more complete understanding of the invention may be had from the detailed description that follows taken with the accompanying drawings in which:

The single figure is a schematic diagram of the inventive circuit.

Referring now to the drawing, there is shown an illustrative embodiment of the invention in a high voltage power supply system employing a push-pull transistor oscillator and a thermionic high vacuum rectifier tube. In general, the oscillator comprises a pair of transistors 10 and 10', energized from a voltage source or battery 12, which supply alternating current to an output transformer 14. A rectifier circuit 16 is energized from the transformer 14.

The transistors 10 and 10' each include, respectively, an emitter electrode 18 and 18', collector electrode 20 and 20', and base electrode 22 and 22'. Both transistors in the illustrative embodiment are preferably of the junction type and are of the P–N–P configuration in which the emitter and collector electrodes are of P type material having holes as majority carriers and the base electrodes are of N type material having electrons as majority carriers. It will be apparent that the transistors may be either point contact or junction type and that an N–P–N configuration may be employed, if desired, with a suitable reversal of polarities.

The output circuits of the transistors 10 and 10' are connected in push-pull fashion with the primary windings 24 and 26 of transformer 14 and the voltage source 12. The output circuit of transistor 10 extends from the emitter electrode 18, through conductor 28, emitter circuit resistor 30, and conductor 46 to the starting switch 32. From the switch 32 the circuit extends to the positive terminal of the voltage source or battery 12 and thence to a point of reference potential or ground 34. The output circuit of transistor 10 is completed through the primary winding 24 of output transformer 14 by connection from ground 36 to center-tap 38 and thence from terminal 40 to collector electrode 20. Similarly, the output circuit of transistor 10' extends from the emitter electrode 18' through conductor 42, emitter resistor 30', conductor 46, switch 32, and battery 12 to ground 34. The circuit is completed to the collector electrode 20' through primary winding 26 by connection from ground 36 to center-tap 38, and thence from terminal 44 to collector electrode 20'.

The input circuit of each transistor includes a feedback circuit which is energized from the output circuit of the other transistor and extends between the emitter and base electrodes. The emitter electrodes 18 and 18' of transistors 10 and 10' are connected through resistor 30 and resistor 30' respectively, to conductor 46. A resistor 48 is connected between conductor 46 and base electrode 22 and a resistor 50 is connected between conductor 46 and base electrode 22'. The feedback circuit includes feedback winding 52 which is inductively coupled to primary windings 24 and 26 and connected by terminals 54 and 56 between base electrodes 22 and 22'. Preferably, a condenser 58 is serially connected with the feedback winding 52 to control the wave shape of the feedback current pulse. By this arrangement, a square wave output and maximum power may be obtained.

The resistors 30 and 30′ in circuit with the emitter electrodes 18 and 18′, respectively, introduce a degenerative voltage in the input circuits of the transistors to enhance the temperature stability of the oscillator. Also, the resistors 48 and 50 in the input circuits of the transistors provide a low resistance path from the emitter to base electrodes which is effective to maintain the operation within the voltage and current ratings of the transistors as the transistor operating temperatures increase. An increase of collector current with temperature, other factors remaining constant, is inherent in transistors and may lead to thermal runaway and ultimate destruction of the transistor unless compensation is provided. The resistors 48 and 50 provide degeneration in the input circuits which increases with the output circuit current to maintain a limiting value thereof.

The circuit arrangement for starting the oscillator includes a resistor 62 connected between base electrodes 22′ and ground connection 64. This completes a circuit from the positive terminal of battery 12, through switch 32, resistor 30′, emitter electrode 18′, base electrode 22′ and resistor 62 to ground connection 64. A circuit is also completed from the positive terminal of battery 12, through switch 32, resistor 30, emitter electrode 18, base electrode 22, resistors 48, 50, and 62, to ground connection 64. The latter circuit is of greater resistance and thus, the starting current supplied to the input circuit of transistor 10′ predominates over that of transistor 10 upon closing switch 32.

The output of the oscillator is coupled by transformer 14 to the full-wave rectifier circuit 16. The rectifier circuit comprises a thermionic or hot cathode, high vacuum rectifier tube or dual diode 63 having plate electrodes 65 and 66 connected to the transformer secondary winding 68 at terminals 70 and 72, respectively. The secondary winding has a center-tap connected to ground 74. A buffer condenser 76 is connected across the secondary winding terminals 70 and 72. The cathode 78 is connected to the output circuit conductor 80 through a filter section resistor 82 for application of the rectified output voltage to any desired utilization device 84 having ground connection 86. A filter condenser 88 is connected between conductor 80 and ground connection 90 and a condenser 92, serving as a filter condenser and as part of the oscillator starting circuit to be described presently, is connected through switch 32′ between the cathode 78 and ground 94.

The circuit thus far described is substantially identical to that disclosed and claimed in the aforementioned U.S. patent application S.N. 559,555 for "Push-Pull Transistor Oscillator," filed January 17, 1956, by Vogt and Scott. It will be helpful to consider the operation of this circuit prior to the description of the inventive features of the present application.

The generation of oscillations is initiated by closing the starting switch 32. This completes the aforementioned starting circuit from the positive terminal of the battery 12 through the emitter and base electrodes of transistor 10′, and resistor 62, to the negative terminal of the battery through the ground connections. This permits a small starting current to flow in the low impedance direction from emitter electrode 18′ to base electrode 22′ which permits an output current to flow from battery 12 through emitter electrode 18′ to collector electrode 20′ and thence through primary winding 26 to ground 36. This current in the output circuit of transistor 10′ induces a voltage in feedback winding 52 by virtue of inductive coupling with primary windings 24 and 26. The relative polarity of the voltages across the primary winding 26 and feedback winding 52, at this instant of operation, are as indicated in the drawings. The induced feedback voltage causes the current to increase in the input circuit of transistor 10′ causing further increase in the output circuit current. The circuit for the feedback current may be traced from the teminal 54 through resistors 48 and 30′, emitter electrode 18′, base electrode 22′, condenser 58, and back to terminal 56 of the feedback winding 52. The feedback current wave form is determined largely by the series condenser 58 and resistors 48 and 30′. The output current reaches a maximum value, as determined by the circuit parameters, and the feedback voltage decreases to zero. The output circuit current through primary winding 26 decreases abruptly, terminating the conductive interval of the cycle for transistor 10′.

When the output circuit current in winding 26 decreases, the magnetic field of the transformer starts to collapse reversing the polarity of the voltage between the terminal 44 and tap 38. This tends to cause a high inverse voltage across the electrodes of transistor 10′ during the non-conductive interval of the cycle of transistor 10′. However, the voltage across the feedback winding 52 is also reversed from that shown and thus the polarity thereof causes an input current to transistor 10 in the low impedance direction between emitter electrode 18 and base electrode 22. This current flow through the low impedance circuit including condenser 58, and resistors 50 and 30 is effective to dissipate the energy stored in the magnetic field of transformer 14 and to thereby limit the inverse voltage on the electrodes of transistor 10′ to a non-destructive value.

The current flow in the input circuit of transistor 10, during the non-conductive interval of transistor 10′, initiates conduction in the output circuit of transistor 10 through the primary winding 24. As a result, a feedback voltage is induced in feedback winding 52 between terminals 54 and 56 which, at this instant of operation, is opposite the polarity indicated in the drawings. The conductive interval for the transistor 10 terminates with the collapse of the magnetic field of transformer 14, in the same manner as described with respect to transistor 10′. The second half-cycle of the oscillator is thus terminated. During the non-conductive interval of the transistor 10, the induced voltage in feedback winding 52 is reversed again, to that shown in the drawings, causing a current to flow in the input circuit of the transistor 10′ in the low impedance direction between emitter electrode 18′ and base electrode 22′. This current flow is effective to limit the inverse voltage developed across the electrodes of transistor 10. The second cycle of the oscillator is initiated by the input current to transistor 10′ and the action just described is repetitive at a high rate to provide sustained oscillations in the primary winding of transformer 14.

The voltage induced in the secondary winding 68 is rectified in a known manner by the full wave rectifier circuit 16. The direct voltage appearing between cathode 78 and ground is applied through the filter section to the conductor 80 and thence to the utilization device 84.

When the oscillator is first started, following a period during which the circuits were deenergized, the oscillations are initiated and build up in the manner just described. In starting under this condition the cathode of the thermionic rectifier 63 is relatively cold and non-emissive until the heater filaments have heated the cathode to operating temperature. Therefore, during the starting interval the rectifier 63 is non-conductive and the secondary winding 68 is operating into a high impedance circuit. The high impedance is reflected by the transformer 14 into the primary windings 24 and 26. The feedback circuit is thus sufficiently energized by winding 52 to afford proper starting at low power. However, if the oscillator is turned off, by opening switch 32, and turned on again, by closing switch 32, before cathode 78 has cooled, starting of the oscillator is unreliable unless a very high power feedback circuit is employed. This undesirable feature results because rectifier 63 is immediately conductive and a low impedance is reflected by the transformer into the oscillator circuit.

In accordance with this invention, immediate and positive starting of the oscillator under all operating conditions is ensured by circuit means effective to retard or delay conduction in the rectifier circuit 16. This is accomplished by the condenser 92 connected between the cathode 78 and ground 94 through a switch 32'. The switch 32' is suitably mechanically interconnected with starting switch 32 for simultaneous actuation therewith. When the oscillator is first started, by closing switches 32 and 32', the oscillator voltage builds up satisfactorily as previously described and the high value rectified output voltage is applied to the load device 84. The high output voltage is also applied across condenser 92, which is now connected to ground by switch 32', and the condenser assumes a charge corresponding to the output voltage. When the oscillator is turned off, the condenser 92 remains charged because switch 32' is opened and there is no discharge path to ground. Upon reclosing the starting switch 32 and switch 32', the charged condenser 92 is effective to maintain the cathode 78 at a high positive potential which delays conduction of the rectifier 63 sufficiently to permit oscillator starting, regardless of the thermal condition of cathode 78 or the load conditions. The condenser 92 discharges through the time constant circuit including condenser 92, resistor 82, condenser 88, and load device 84.

Although this description has been given with respect to particular embodiments, it is not to be construed in a limiting sense upon the scope of the invention. Many variations and modifications within the spirit and scope of the invention will now occur to those skilled in the art. For a definition of the invention, reference is made to the appended claims.

I claim:

1. In combination, an oscillator including a voltage source and switching means for energization thereof, a rectifier circuit coupled with the oscillator for energization thereby and including a rectifying device which is conductive in the forward direction at low voltage, a condenser connected across the electrodes of said rectifying device to accumulate a voltage therefrom, said switching means including circuit interrupting means in series with said condenser whereby the rectifying device is biased in the reverse direction by the accumulated voltage on said condenser after deenergization of the oscillator to delay conduction of the rectifying device upon subsequent energization of the oscillator.

2. In combination, an oscillator including a voltage source and switching means for energization thereof, a rectifier circuit coupled with the oscillator for energization thereby and including a rectifying device which is conductive in the forward direction at low voltage, a load device connected across the rectifier circuit, a filter section interposed between the rectifier circuit and the load device and including a condenser connected across the electrodes of the rectifying device, said switching means including circuit interrupting means in series with said condenser whereby the rectifying device is biased in the reverse direction after deenergization of the oscillator.

3. In combination, an oscillator including a voltage source and switch for energization thereof, a rectifier circuit coupled with the oscillator for energization thereby, a load device connected with the rectifier circuit, said rectifier circuit including a rectifying device which is conductive at low voltage, a condenser connected in parallel circuit with said load device, and means for opening and closing the parallel circuit simultaneously with opening and closing actuation of said switch.

4. In combination, a transistor oscillator including a voltage source and a first switch for energization thereof, a coupling transformer having a primary winding connected with the output circuit of the oscillator, a feedback winding on the transformer connected with the input circuit of the oscillator for sustaining oscillations in the output circuit, a rectifier circuit connected with the secondary winding of the transformer, a load device connected with the rectifier circuit, said rectifier circuit including a thermionic high vacuum diode, and a condenser and a second switch connected in series from the diode cathode across the load device, said first and second switches being connected for simultaneous actuation.

References Cited in the file of this patent

UNITED STATES PATENTS

| | | |
|---|---|---|
| 2,754,466 | Brown | July 10, 1956 |
| 2,780,767 | Janssen | Feb. 5, 1957 |
| 2,854,582 | Guyton | Sept. 30, 1958 |